United States Patent [19]

Nail

[11] 4,341,085
[45] Jul. 27, 1982

[54] FREEZE CONCENTRATION APPARATUS AND METHOD

[75] Inventor: James A. Nail, Carol Stream, Ill.

[73] Assignee: Chicago Bridge & Iron Company, Oak Brook, Ill.

[21] Appl. No.: 240,608

[22] Filed: Mar. 4, 1981

[51] Int. Cl.³ .............................................. F25J 9/04
[52] U.S. Cl. ...................................... 62/124; 62/542; 62/541
[58] Field of Search ................ 62/532, 541, 542, 123, 62/124

[56] References Cited

U.S. PATENT DOCUMENTS 3,205,078  9/1965  Lund ..................................... 62/542
3,488,974  1/1970  Lunde et al. ......................... 62/542
4,046,534  9/1977  Maguire, Sr. ......................... 62/542

Primary Examiner—Norman Yudkoff
Attorney, Agent, or Firm—Merriam, Marshall & Bicknell

[57] ABSTRACT

Freeze concentrating an aqueous liquid mixture by feeding an aqueous liquid mixture to a freeze exchanger for indirect cooling by heat exchange to a cold fluid to form ice crystals in the liquid mixture; feeding the liquid mixture containing ice crystals from the freeze exchanger to the lower internal space of a vessel containing said aqueous liquid mixture whereby the ice floats to the top interior of the vessel; removing ice from the top interior of the vessel, washing the ice with water and heating the washed ice to produce potable water; removing aqueous liquid mixture from the vessel and recycling it to the freeze exchanger; and repeating the method in a continuous operation.

7 Claims, 3 Drawing Figures

FREEZE CONCENTRATION APPARATUS AND METHOD

This invention relates to apparatus for, and methods of, concentrating an aqueous liquid mixture such as fruit and vegetable juices, seawater, brackish water, waste water, and aqueous chemical solutions and dispersions, by removing a portion of the water as ice.

BACKGROUND OF THE INVENTION

It is often necessary, or at least desirable, to concentrate a liquid mixture by removing a portion of the solvent, generally water, from the liquid mixture. The resulting product, therefore, is in a more concentrated form. It has been common to concentrate fruit and vegetable juices such as orange juice, grapefruit juice, grape juice, and tomato juice by evaporation to remove water. In addition, seawater and brackish water have been concentrated by evaporation, although the condensed vapor has been recovered as usable potable water rather than discarded as in concentrating fruit and vegetable juices. Nevertheless, each is a concentrating process. In the case of juice, the concentrate is the desirable product whereas in obtaining potable water from seawater or brackish water the concentrate is discarded.

Evaporative concentration as described, as well as evaporation of chemical solutions or liquid dispersions, requires substantial energy since it relies on the latent heat of vaporization. Scaling of equipment and enhanced corrosion are often inherent at the temperatures involved in evaporative concentration. Loss of flavor and aroma also result during evaporative concentration of food products.

Because of the shortcomings involved in evaporative concentration, it has been found advantageous to freeze concentrate many products, particularly those having water as the liquid carrier. Generally, reduced energy is required since freeze concentrating relies on the heat of fusion instead of the heat of evaporation. In such a process, water is removed by first producing ice crystals which are then separated from the concentrate in a concentrator or separator vessel. Next, the ice crystals are washed in a washer vessel to remove the concentrate remaining on them. The ice crystals can then be discarded or melted if potable water is desired.

Ogman U.S. Pat. No. 4,091,635 in part discloses freeze crystallizing in one vessel and then feeding an ice slurry to a wash column where the ice is separated and washed. This patent, however, does not teach a system of recycling the aqueous concentrate from the wash column to the freeze crystallizer vessel in which the ice is formed. Such recycling is believed to have been avoided as impractical with the previously available freeze crystallizers, perhaps because of ice bulid-up problems.

Recently, my associates have developed a freeze exchanger of the shell and tube structure in which an aqueous liquid mixture can be indirectly cooled, as it flows through the tubes, by heat exchange to a circulating cold fluid, usually a refrigerant, on the shell side. Such a freeze exchanger is diclosed in the copending U.S. patent applications of Engdahl Ser. No. 160,112 filed June 16, 1980 and Stafford et al. Ser. No. 191,357 filed Sept. 29, 1980 and Ser. No. 197,482 filed Oct. 16, 1980. Ice bulid-up in the tubes is avoided, or at least greatly reduced, by highly polishing the tube surfaces. Another way is to coat the tube surfaces with a substance to which ice has a very low adherence.

SUMMARY OF THE INVENTION

According to one aspect of the invention, a method of freeze concentrating an aqueous liquid mixture is provided comprising feeding an aqueous liquid mixture to a freeze exchanger for indirect cooling by heat exchange to a cold fluid to form ice crystals in the liquid mixture; feeding the liquid mixture containing ice crystals from the freeze exchanger to the lower internal space of a vessel containing said aqueous liquid mixture whereby the ice floats to the top interior of the vessel; removing ice from the top interior of the vessel, washing the ice with water and heating the washed ice to produce potable water; removing aqueous liquid mixture from the vessel and recycling it to the freeze exchanger; and repeating the method in a continuous operation.

The method is highly efficient because of its relative simplicity. The aqueous liquid mixture containing ice is subjected to a combined separation and concentration in a single vessel and, furthermore, is also desirably washed while in the same vessel. Recycling aqueous liquid mixture from the vessel to the freeze exchanger also serves to increase efficiency because it is already at a cold temperature when it is withdrawn from the vessel to be recycled.

In practicing the method, a feed stream of ice-free aqueous liquid mixture can be fed to the freeze exchanger. Excess aqueous liquid mixture can be removed from the vessel as a withdrawal stream. The ice-free feed stream can be passed in indirect heat exchange with the withdrawal stream before the ice-free feed stream is fed to the vessel.

The cold fluid providing cooling in the freeze exchanger can be a refrigerant which is a gas at atmospheric pressure and room temperature. Ammonia is preferably employed as the refrigerant. Regardless of the refrigerant used, when it is compressed in a refrigeration cycle the heat rejected in the refrigeration cycle can be used to melt the washed ice to produce potable water.

The freeze exchanger desirably is of shell and tube structure. While the tubes can be vertical it is preferable that they be horizontal.

According to a further aspect of the invention, apparatus is provided for freeze concentrating an aqueous liquid mixture comprising a freeze exchanger; a first liquid conduit communicating with the freeze exchanger for feeding an aqueous liquid mixture to the freeze exchanger for indirect heat exchange therein with a cold fluid fed to the freeze exchanger; a second liquid conduit communicating with the freeze exchanger and a vessel for feeding an aqueous liquid mixture containing ice from the freeze exchanger to the vessel in which the ice floats on top of aqueous liquid mixture in the vessel; means for withdrawing floating ice from the vessel; and a third liquid conduit communicating with the vessel for withdrawing aqueous liquid mixture from the vessel.

The freeze exchanger desirably is of shell and tube structure having means for the aqueous liquid mixture to flow through the tubes. The freeze exchanger is desirably positioned to have the tubes horizontal, although the tubes can also be vertical.

The third liquid conduit can be placed in communication with the first liquid conduit. Furthermore, a pump can be positioned between the third and first liquid conduits to pump the liquid to the freeze exchanger.

A fourth liquid conduit is desirably included in communication with the vessel for feeding aqueous liquid mixture either to the vessel, to the third liquid conduit, or both. The apparatus can also include a fifth liquid conduit in communication with the vessel for withdrawing aqueous liquid mixture from the vessel.

The fourth liquid conduit can have an inlet end which communicates with a first heat exchanger in which an inlet stream of aqueous liquid mixture is indirectly cooled before it flows into the fourth liquid conduit. Also, the fifth liquid conduit can be placed in communication with the first heat exchanger for feeding cold aqueous liquid mixture from the vessel to the heat exchanger.

In a particular useful embodiment, the apparatus is provided with a spray means for washing the ice with potable water before the ice is removed from the vessel. As an adjunct to such washing means, the vessel can have an open top and an outwardly spaced shell means surrounding the upper part of the vessel, and extending above the vessel top, for collecting washed ice which is removed from the vessel. An annular space is desirably defined by the vessel and the outwardly spaced shell. A heating means can be positioned in the annular space to melt ice therein. A sixth liquid conduit can communicate with the annular space for withdrawing water therefrom. However, the sixth liquid conduit can communicate with the spray means for washing the ice with potable water before the ice is removed from the vessel.

The heating means for melting the ice can be a heat rejecting heat exchanger of a refrigerator. Also, a conduit means extending from the refrigerator to the freeze exchanger can be used for circulating cold fluid from the refrigerator through the freeze exchanger.

The cold fluid used in the freeze exchanger desirably is a refrigerant which is a gas at atmospheric pressure and room temperature. Ammonia is the refrigerant of choice.

DETAILED DESCRIPTION OF THE DRAWINGS

To the extent it is reasonable and practical, the same numbers will be used to identify the same or similar parts in the various views of the drawings.

Figure 1:
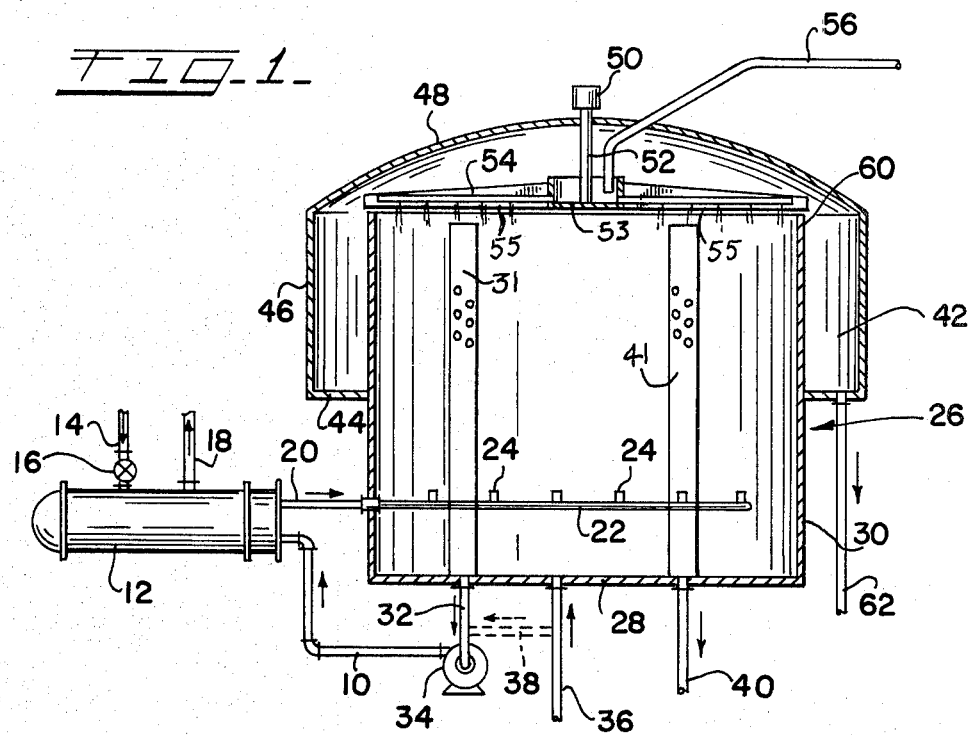
FIG. 1 is an elevational view, partially in section, of freeze concentrating apparatus provided by the invention having a horizontal shell and tube freeze exchanger.

The apparatus illustrated by FIG. 1 includes a conduit 10 which feeds an aqueous liquid mixture to the tube side of shell and tube freeze exchanger 12. The freeze exchanger 12 is cooled on the shell side by a cold fluid fed thereto by liquid conduit 14. If the cold fluid is a compressed refrigerant gas, such as ammonia, expansion valve 16 can be included in conduit 14 so that the refrigerant can be expanded into the shell side of freeze exchanger 12. The warmed cold fluid is removed from freeze exchanger 12 by conduit 18 for recooling, after which it may be recycled to conduit 14.

The aqueous liquid mixture is cooled as it flows through freeze exchanger 12 and ice crystals form. The ice-containing aqueous liquid mixture is fed from freeze exchanger 12 to liquid conduit 20 which includes a manifold section 22, having outlets 24, located in the lower interior space of combined separator-washer vessel 26.

Vessel 26 has a flat circular metal bottom 28 and a vertical circular cylindrical metal wall 30. Liquid conduit 32 communicates with the lower interior space of perforated vertical drain tube 31 in vessel 26 and with conduit 10 through pump 34. This is presently considered the most desirable arrangement for supplying freeze exchanger 12 with aqueous liquid mixture since the liquid removed from vessel 26 through tube 31 by conduit 32 is already cold. However, conduit 36 in conjunction with alternative by-pass conduit 38 can be used to deliver an incoming stream of aqueous liquid mixture to pump 34 for delivery to conduit 10. Such a feed supply can be used with or without the conjoint use of conduit 32. Nevertheless, the preferred arrangement is to feed the incoming stream of aqueous liquid mixture directly into vessel 26 by means of conduit 36 and not to use conduit 38 at all. In this way, the liquid becomes further cooled by intermixing with liquid in vessel 26 before it is withdrawn by conduit 32. Conduit 40 communicates with the lower interior space of perforated vertical drain tube 41 in vessel 26 and is used to withdraw excess aqueous liquid mixture from vessel 26. Tubes 31 and 41 provide a resistance to the flow of liquid through vessel 26 and thereby increase the hydrostatic force on the underside of the ice bed.

When the ice-containing aqueous liquid mixture exits outlets 24 the ice, being less dense than water, rises to the top interior space of vessel 26 and is supported by the liquid volume in the vessel. The ice-water interface in vessel 26 is maintained quite high and very little ice is distributed through the lower liquid volume. Accordingly, the liquid withdrawn by conduits 32 and 40 is substantially free of ice, as is the feed stream supplied by conduit 36.

Annular space 42, defined by a flat ring bottom 44 and vertical circular cylindrical shell 46, surrounds the upper part of vessel 26. Domed roof 48 is supported by the top of shell 46 and serves to cover both vessel 26 and annular space 42 while providing access between the two over the top edge of wall 30.

Motor 50, mounted on roof 48, drives vertical shaft 52 on the lower end of which is mounted tank 53. Scraper blades 54 project radially and horizontally outwardly from tank 53 to which they are joined. Potable wash water flows from tank 53 through radial and horizontal water distribution pipes 55. Pipes 55 can be supported by scraper blades 54. Potable water conduit 56 communicates with tank 53 for supplying water to the tank. The water flows by gravity from tank 53, through pipes 55 and out suitable spray holes or nozzles positioned along the length of the pipes. The potable water sprays onto the bed of ice crystals in the upper part of vessel 26. The washed crystals are caused to spill over the top edge 60 of wall 30 into the space 42 by rotation of scraper blades 54. The ice in space 42 is desirably melted in situ and the water then removed by means of conduit 62. However, the ice can be removed from space 42 and used as such or melted elsewhere.

The apparatus described above in conjunction with FIG. 1 is especially useful in the production of potable water from sea water or brackish water. The ice which is produced and separated furnishes the potable water when it is melted. The apparatus, however, can be used to concentrate fruit and vegetable juices but in such concentration processes the ice which is obtained is discarded, generally after its refrigeration is recovered.

Figure 2:
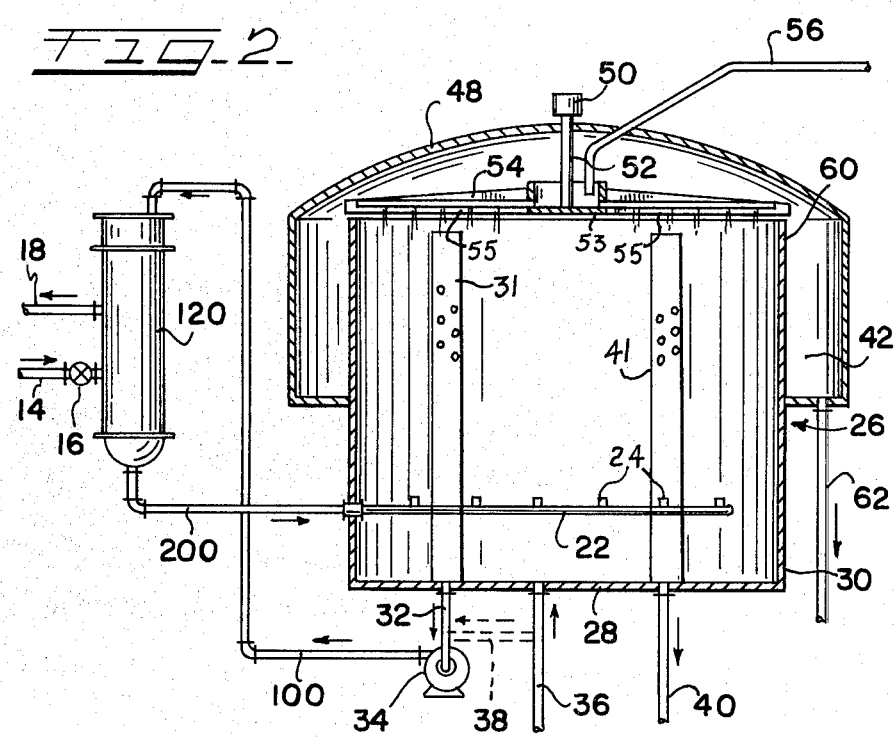
FIG. 2 is like FIG. 1 except that in FIG. 2 the freeze exchanger is vertical.

The apparatus illustrated by FIG. 2 is very similar to that illustrated by FIG. 1. The main difference between the two is that the apparatus of FIG. 2 uses a vertical freeze exchanger 120 instead of the horizontal freeze exchanger 12 shown in FIG. 1. Use of the vertical freeze exchanger 120 necessitates that liquid conduit 100 deliver the aqueous liquid mixture from pump 34 to a liquor box inside of the top of freeze exchanger 120 which communicates with the tubes. In addition, conduit 200 removes the ice-containing aqueous liquid mixture from the bottom of the freeze exchanger 120 and feeds it to manifold section 22.

Figure 3:
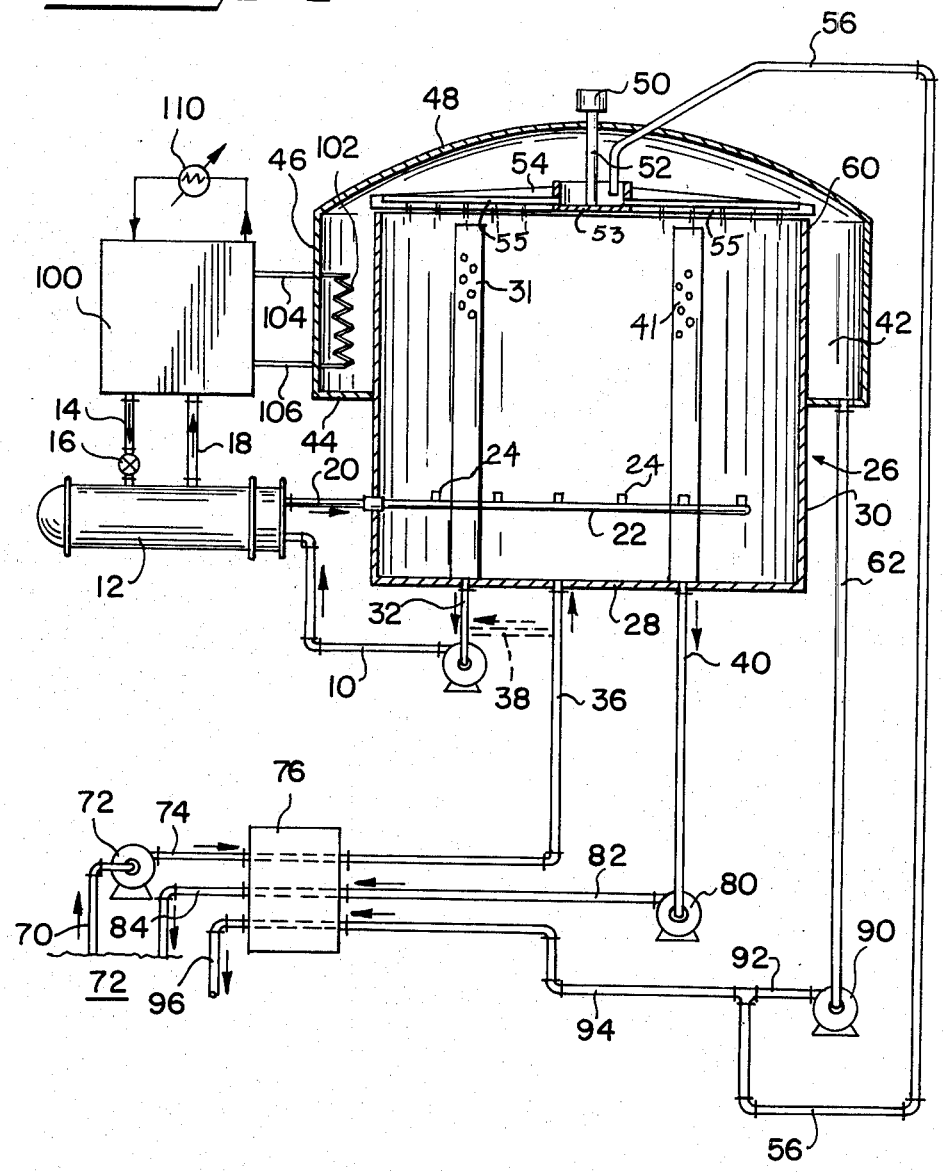
FIG. 3 is like FIG. 1 except that the apparatus includes a prime refrigerator and a heat exchanger for recovering refrigeration from liquid withdrawn from the combined separator-washer vessel.

The apparatus illustrated by FIG. 3 is an enlarged or expanded embodiment of the apparatus illustrated by FIG. 1, which it completely incorporates.

As is shown in FIG. 3, liquid conduit 70 is placed in communication with a source 72 of a warm aqueous liquid mixture, such as sea water, and pump 72. The warm liquid is delivered by pump 72 to liquid conduit 74 which delivers it to heat exchanger 76. The cooled liquid is removed from heat exchanger 76 by liquid conduit 36 which then distributes it as previously described.

Cold liquid removed from vessel 26 by liquid conduit 40 is delivered to pump 80 which feeds it to liquid conduit 82. Conduit 82 delivers the liquid to heat exchanger 76 in which it is warmed by heat exchange with the feed stream supplied thereto by conduit 74. The warmed liquid is removed from heat exchanger 76 by liquid conduit 84 for disposal.

Potable water removed from space 42 by liquid conduit 62 is delivered by it to pump 90 from which it is fed to liquid conduit 92. Conduit 92 communicates with both liquid conduits 94 and 56 so that part of the cold potable water is used to wash the ice crystals and part of the cold water is fed to heat exchanger 76 to cool the liquid feed supplied by conduit 74. After passing through heat exchanger 76, the water supplied thereto by conduit 94 is withdrawn by conduit 96 for use as potable water.

Prime refrigerator 100 supplies the compressed refrigerant fed by conduit 14 to the shell side of freeze exchanger 12 and by conduit 18 it receives the expanded refrigerant from the freeze exchanger. To facilitate melting the ice which accumulates in annular space 42, a heat exchanger 102 is positioned in that space. Refrigerant, at an elevated temperature, from refrigerator 100 is circulated through heat exchanger 100 by conduits 104 and 106. Excess heat from refrigerator 100 can be disposed of by heat rejection to an ambient heat sink 110, such as ambient or atmospheric air.

The apparatus illustrated by FIG. 3 and described above is especially useful for producing potable water from sea water. The combined separator-washer vessel 26 eliminates one of the two vessels previously required by prior art systems and which were considered necessary because of the way in which the ice was formed. By the use of a freeze exchanger, such as of shell and tube structure, which permits freezing and ice crystal formation without plugging it is possible according to this invention to feed the ice-containing liquid directly from the freeze exchanger to a vessel which permits combined separation and washing of the ice. This allows use of a single pump to circulate the liquid from vessel 26 to and through freeze exchanger 12.

The foregoing detailed description has been given for clearness of understanding only, and no unnecessary limitations should be understood therefrom as modifications will be obvious to those skilled in the art.

What is claimed is:

1. Apparatus for freeze concentrating an aqueous liquid mixture comprising:
   a freeze exchanger;
   a first liquid conduit communicating with the freeze exchanger for feeding an aqueous liquid mixture to the freeze exchanger for indirect heat exchange therein with a cold fluid fed to the freeze exchanger;
   a vessel having an open top and an outwardly spaced shell means surrounding the upper part of the vessel, and extending above the vessel top, defining an annular space for collecting washed ice which is withdrawn from the vessel;
   a second liquid conduit communicating with the freeze exchanger and the vessel for feeding an aqueous liquid mixture containing ice from the freeze exchanger to the vessel in which the ice floats on top of aqueous liquid mixture in the vessel;
   means for withdrawing washed floating ice from the vessel and delivering it to the vessel annular space;
   a third liquid conduit communicating with the first liquid conduit and with the vessel for withdrawing aqueous liquid mixture from the vessel; and
   a fourth liquid conduit communicating with the vessel for feeding aqueous liquid mixture thereto.

2. Apparatus according to claim 1 in which an annular space is defined by the vessel and the outwardly spaced shell and heating means is positioned in the annular space to melt ice therein.

3. Apparatus according to claim 2 in which a sixth liquid conduit communicates with the annular space for withdrawing water therefrom.

4. Apparatus according to claim 3 in which the sixth liquid conduit communicates with the spray means for washing the ice with potable water before the ice is removed from the vessel.

5. Apparatus for freeze concentrating an aqueous liquid mixture comprising:
   a freeze exchanger;
   a first liquid conduit communicating with the freeze exchanger for feeding an aqueous liquid mixture to the freeze exchanger for indirect heat exchange therein with a cold fluid fed to the freeze exchanger;
   a second liquid conduit communicating with the freeze exchanger and a vessel for feeding an aqueous liquid mixture containing ice from the freeze exchanger to the vessel in which the ice floats on top of aqueous liquid mixture in the vessel;
   means for withdrawing floating ice from the vessel;
   a third liquid conduit communicating with the vessel for withdrawing aqueous liquid mixture from the vessel;
   the vessel having an open top and an outwardly spaced shell means surrounding the upper part of the vessel, and extending above the vessel top, thereby defining an annular space for collecting ice which is removed from the vessel after washing;

heating means positioned in the annular space to melt ice therein, said heating means being a heat rejecting heat exchanger of a refrigerator; and conduit means extending from the refrigerator to the freeze exchanger for circulating cold fluid from the refrigerator through the freeze exchanger.

6. Apparatus according to claim 5 in which the cold fluid is a refrigerant which is a gas at atmospheric pressure and room temperature.

7. Apparatus according to claim 6 in which the refrigerant is ammonia.

* * * * *